(12) United States Patent
Tognazzini et al.

(10) Patent No.: US 6,624,824 B1
(45) Date of Patent: Sep. 23, 2003

(54) TILT-SCROLLING ON THE SUNPAD

(75) Inventors: Bruce Tognazzini, Woodside, CA (US); Jakob Nielsen, Atherton, CA (US); Bob Glass, Los Gatoes, CA (US)

(73) Assignee: Sun Microsystems, Inc., Santa Clara, CA (US)

( * ) Notice: Subject to any disclaimer, the term of this patent is extended or adjusted under 35 U.S.C. 154(b) by 1164 days.

(21) Appl. No.: 08/642,224

(22) Filed: Apr. 30, 1996

(51) Int. Cl.[7] .................................. G09G 5/34
(52) U.S. Cl. .................. 345/684; 345/169; 345/173
(58) Field of Search ................. 345/156, 123, 345/157, 145, 160, 163, 168, 169, 173, 341, 684, 784, 785, 786, 787; 382/293, 295; 463/37, 39, 40, 42; 341/32, 34; 348/39, 734

(56) References Cited

U.S. PATENT DOCUMENTS

| | | | | |
|---|---|---|---|---|
| 4,754,268 A | * | 6/1988 | Mori ........................... | 345/168 |
| 4,890,099 A | * | 12/1989 | Takano ........................ | 345/123 |
| 5,056,629 A | * | 10/1991 | Tsuji et al. .................. | 340/724 |
| 5,088,070 A | * | 2/1992 | Shiff ........................... | 345/156 |
| 5,122,785 A | * | 6/1992 | Cooper ........................ | 345/123 |
| 5,355,352 A | * | 10/1994 | Kobayashi et al. ........... | 368/10 |
| 5,367,631 A | * | 11/1994 | Levy ........................... | 345/163 |
| 5,481,265 A | * | 1/1996 | Russell ....................... | 345/157 |
| 5,526,022 A | * | 6/1996 | Donahue et al. ............ | 345/156 |
| 5,578,999 A | * | 11/1996 | Matsuzawa et al. ........ | 345/169 |
| 5,594,462 A | * | 1/1997 | Fishman et al. ............ | 345/169 |
| 5,602,566 A | * | 2/1997 | Motosyuku et al. ........ | 345/123 |

* cited by examiner

*Primary Examiner*—Lun-Yi Lao
(74) *Attorney, Agent, or Firm*—Finnegan, Henderson, Farabow, Garrett & Dunner, L.L.P.

(57) ABSTRACT

Scrolling techniques for computing devices are disclosed which respond to the amount of tilt, measured against a reference, experienced by a control unit. The user set the reference by activating a switch while the control unit is in an orientation selected by the user. Once the reference is set, the direction and rate of scrolling is determined by the direction and amount of tilt. The control unit may be built into a hand held computing device such as the Sun Pad.

4 Claims, 13 Drawing Sheets

DISPLAY TIME

SET TIME

- SET HOUR

-SET MINUTE $< \begin{matrix} 1 \\ 2 \\ 3 \\ 4 \end{matrix}$

.
    .
    .

SET DATE

SET MONTH

DAY

YEAR

STOP WATCH

RESET

LAP

FIG. 8

TILT-SCROLLING ON THE SUNPAD

BACKGROUND OF THE INVENTION

1. Field of the Invention

The invention relates to computers and more particularly to scrolling information on computers as a function of how much a hand held device is tilted.

2. Description of Related Art

When more information is to be displayed to a computer user than a display can conveniently hold it is known to scroll the information to position the information of interest at any particular moment within the viewing window of a computer or other similar device. Information, such as text, which is one dimensional, is scrolled typically vertically. Two dimensional information, such as drawings, may require scrolling in both the vertical and horizontal directions in order to position the viewing window over the desired portion of the drawing to be viewed.

There are four traditional ways of scrolling. The first is by direct manipulation of an indicator or "thumb" on a scroll bar positioned vertically and/or horizontally on or adjacent to the viewing window. The thumb is manipulated using a mouse or other pointing device.

A second method of scrolling includes clicking on graphical elements in a scroll bar (e.g. clicking at some point within the trough of the scroll bar or clicking on special up/down buttons) to scroll a line or a screenful at a time.

A third method involves pressing physical buttons on the keyboard, such as an up arrow to move up a line and the page up key to move up a screenful.

A fourth way of scrolling involves the use of a flicking gesture with a pen device to scroll an amount indicated by the length of flick.

The Problems

Each of the traditional ways of scrolling requires the user to interact with specific elements on the screen or connected to the computer and are thus less suited for a portable computing device, such as the Sunpad™, that is typically held by both hands.

The traditional ways of scrolling are notorious for overshooting a desired position. It is difficult for a user to vary the scroll speed using the traditional interaction techniques.

There is thus a need for improving the scrolling mechanisms for information displays particularly for those displays utilizing hand held computing devices.

SUMMARY OF THE INVENTION

The present invention provides apparatus, systems, processes and computer program products which overcome the problems described above. Embodiments of the invention control scrolling as a function of the amount of tilt a computer device experiences with respect to a reference orientation. The reference orientation is preferably set by storing a particular orientation of the device with respect to the horizontal at a point in time specified by a user, by, for example, pressing a button. The orientation of the device at sufficient intervals is then compared with the reference orientation to determine the direction and rate of scrolling. The rate of scrolling is controlled as a function of the amount of tilt between the orientation of the device and the reference, i.e. the rate of scrolling is controlled as a function of the angle between the device orientation and the reference, preferably such that the rate is a function of the angular difference squared. Embodiments are disclosed in which tilt in one direction controls a first action and tilt in an orthogonal direction controls a different action.

The invention is directed to a method for displaying information on a display of a computing device by scrolling the information to be displayed as a function of tilt of a control element with respect to a reference. The reference value is preferably set when scrolling is activated such as by the user pushing a button or by squeezing a hand held element. The direction of scrolling is determined by which way the control element is tilted with respect to the reference, e.g. up/down or left/right depending on whether the direction of tilt with respect to the reference is up or down, left or right. Tilt in one direction may control a first action such as scrolling of text and tilt in an orthogonal direction controls a different action such as changing a page of text in a viewing window.

The control element can be either built into the computing device itself or be separate from it. If separate, it can be either connected to the computing device or linked to the computing device by electromagnetic radiation. In one preferred form of the invention, the computing device is hand held.

Scrolling preferably includes scrolling at a rate which is a function of the angle of tilt squared. For some applications it is advantageous to set the rate of scrolling in points per second to render the scrolling independent of font size and/or resolution.

The invention is also directed to apparatus for displaying information on a display, including a tilt detector, a scroll mode selector, a reference store configured to save a value of tilt detected by the tilt detector when the scroll mode selector is activated and a control device connected to the tilt detector and said display at a rate which is a function of the difference between the output of the tilt detector and the value of tilt stored in said reference store. Information to be displayed can be received in a number of ways such as from a disk controller over a bus or from a communications controller over a communications link.

The invention can be incorporated into a timepiece and used to scroll menu options and to select and activate time piece functions. Alternatively, the invention can be incorporated into an item of user wearable apparel and linked to said display over a electromagnetic or infra-red communications link.

The invention is also directed to a computer system in which a plurality of computers are linked together, such as over a network in which at least one of the computers is configured to scroll information at a rate which is a function of tilt of a control element with respect to a reference.

The invention is also directed to a computer program product for displaying information on a display of a computing device having a tilt sensor, including a computer readable memory medium and a computer program, stored on the medium, including program steps for storing at least one initial output of said tilt sensor when a scroll function is activated, program steps for calculating a difference between at least one output of said tilt sensor and a scrolling of information on said display at a rate which is a function of said difference.

Still other objects and advantages of the present invention will become readily apparent to those skilled in the art from the following detailed description, wherein only the preferred embodiment of the invention is shown and described, simply by way of illustration of the best mode contemplated of carrying out the invention. As will be realized, the invention is capable of other and different embodiments, and its several details are capable of modifications in various obvious respects, all without departing from the invention. Accordingly, the drawing and description are to be regarded as illustrative in nature, and not as restrictive.

BRIEF DESCRIPTION OF DRAWINGS

The objects, features and advantages of the system of the present invention will be apparent from the following description in which:

FIG. 7 is an illustration of a exemplary timepiece with scroll control of the invention built-in.

FIG. 8 is an exemplary menu hierarchy of a timepiece illustrated in FIG. 7.

NOTATIONS AND NOMENCLATURE

The detailed descriptions which follow may be presented in terms of program procedures executed on a computer or network of computers. These procedural descriptions and representations are the means used by those skilled in the art to most effectively convey the substance of their work to others skilled in the art.

A procedure is here, and generally, conceived to be a self-consistent sequence of steps leading to a desired result. These steps are those requiring physical manipulations of physical quantities. Usually, though not necessarily, these quantities take the form of electrical or magnetic signals capable of being stored, transferred, combined, compared, and otherwise manipulated. It proves convenient at times, principally for reasons of common usage, to refer to these signals as bits, values, elements, symbols, characters, terms, numbers, or the like. It should be noted, however, that all of these and similar terms are to be associated with the appropriate physical quantities and are merely convenient labels applied to these quantities.

Further, the manipulations performed are often referred to in terms, such as adding or comparing, which are commonly associated with mental operations performed by a human operator. No such capability of a human operator is necessary, or desirable in most cases, in any of the operations described herein which form part of the present invention; the operations are machine operations. Useful machines for performing the operation of the present invention include general purpose digital computers or similar devices.

The present invention also relates to apparatus for performing these operations. This apparatus may be specially constructed for the required purpose or it may comprise a general purpose computer as selectively activated or reconfigured by a computer program stored in the computer. The procedures presented herein are not inherently related to a particular computer or other apparatus. Various general purpose machines may be used with programs written in accordance with the teachings herein, or it may prove more convenient to construct more specialized apparatus to perform the required method steps. The required structure for a variety of these machines will appear from the description given.

DESCRIPTION OF THE PREFERRED EMBODIMENT

Figure 1A:
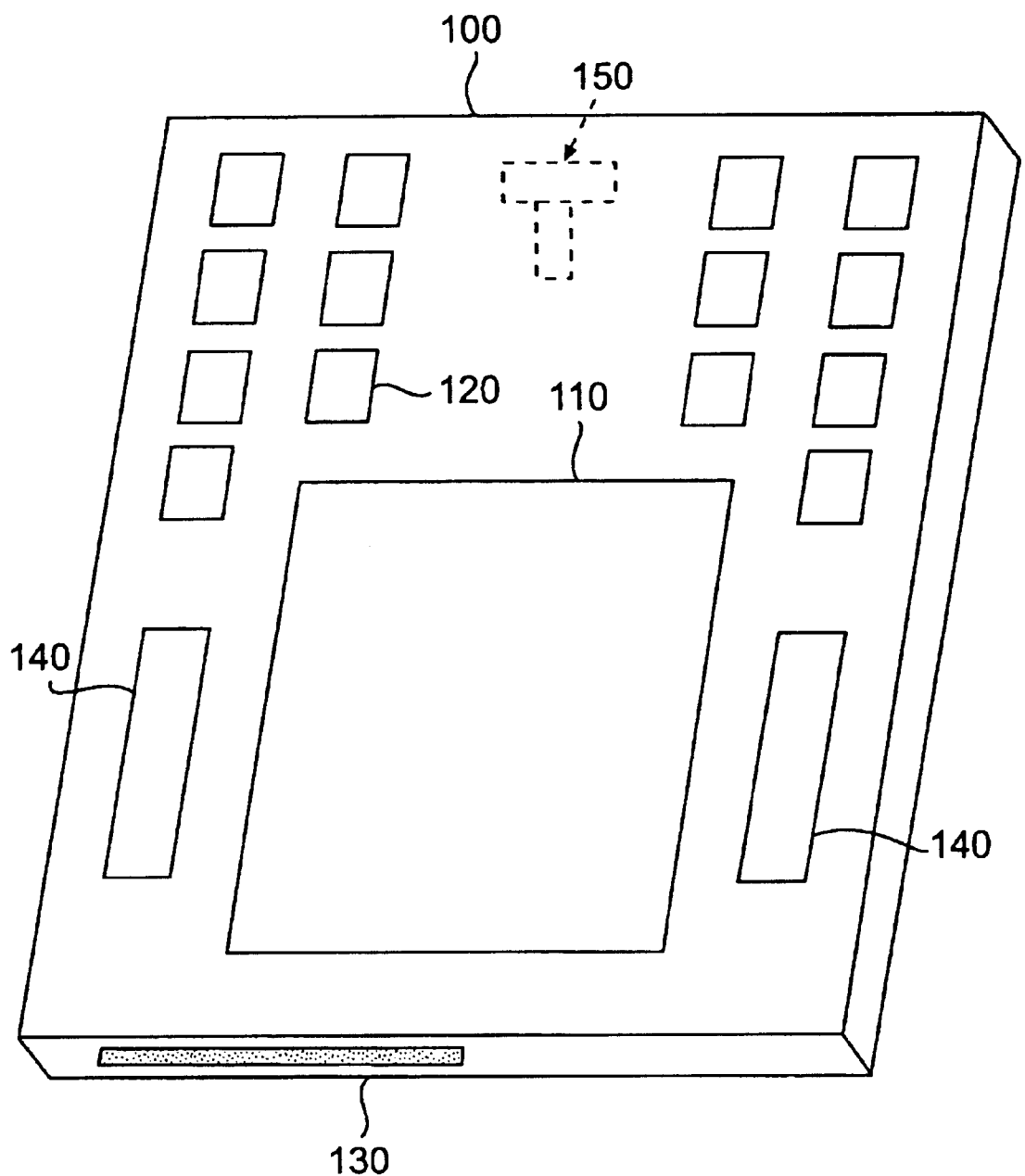
FIG. 1A is an illustration of a hand held computing device.

FIG. 1A is an illustration of a hand held computing device (100) in accordance with the invention. Computing device 100 has a display screen 110 for displaying the information to the user. A computer device has a number of control buttons 120 for actuating the various control functions within the capability of the computing device. The computing device may be equipped optionally with one or more disk drives 130, which may accommodate either floppy disks, CD Roms or other memory media. On either side of the display screen 110 are switches 140 which are preferably pressure sensitive switches designed so that under normal gripping pressures, the switch will not activate. However, when one or the other, or both switches 140 are squeezed by an amount which exceeds a threshold pressure, contact will be made between the switch elements to activate control of the scrolling function. Switches 140 are located in the areas normally used for gripping of the hand held device when in use.

Figure 1B:
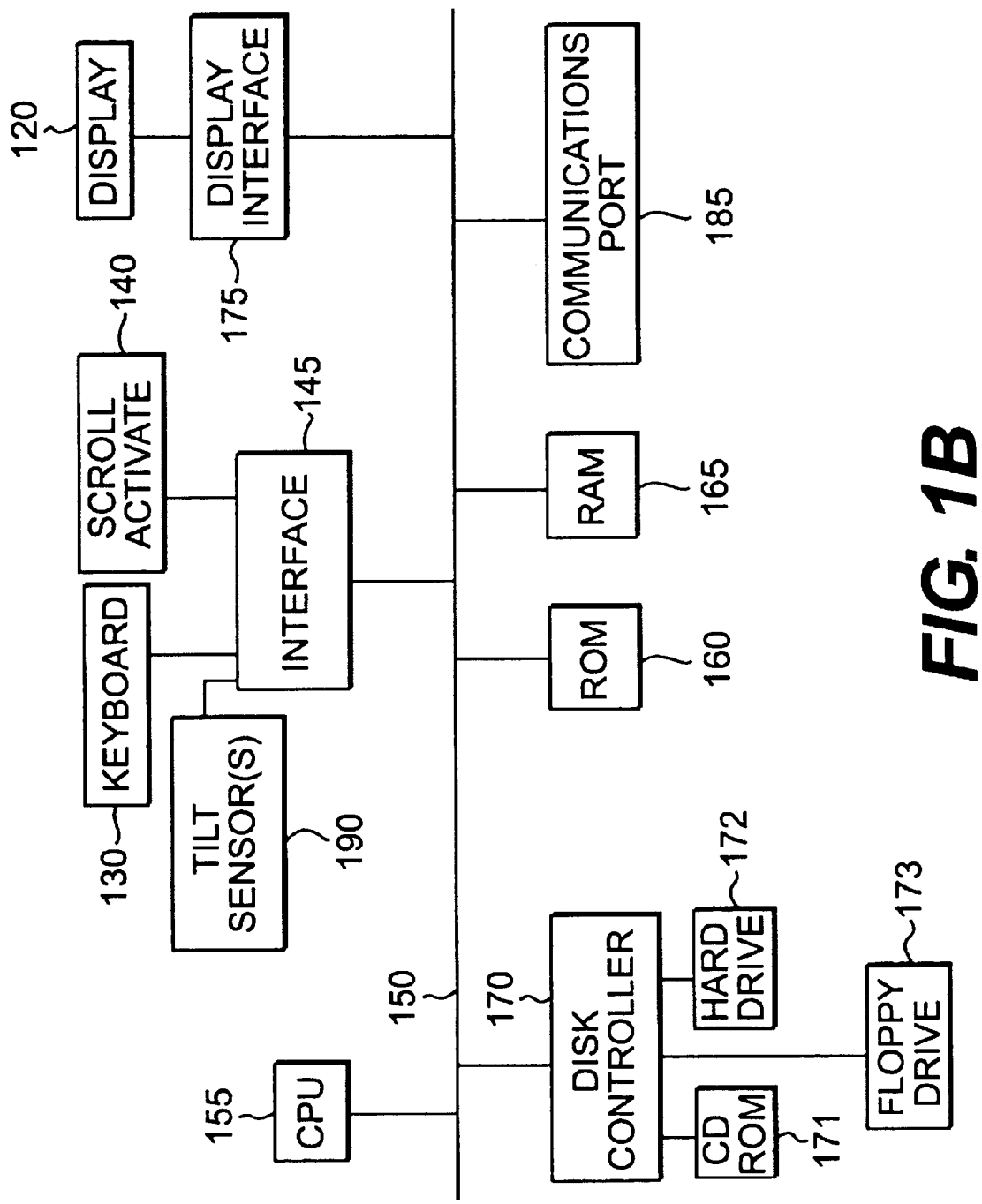
FIG. 1B illustrates a block diagram of the computer of FIG. 1A in accordance with the invention.
Figure 1C:
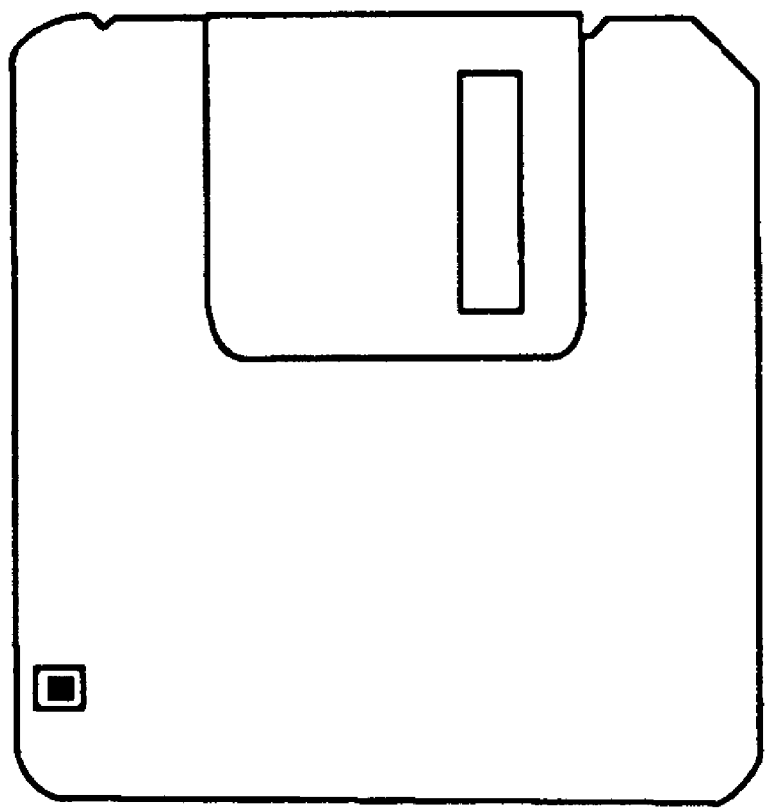
FIG. 1C illustrates an exemplary memory medium containing a program usable with the computer of FIG. 1A.
Figure 2:
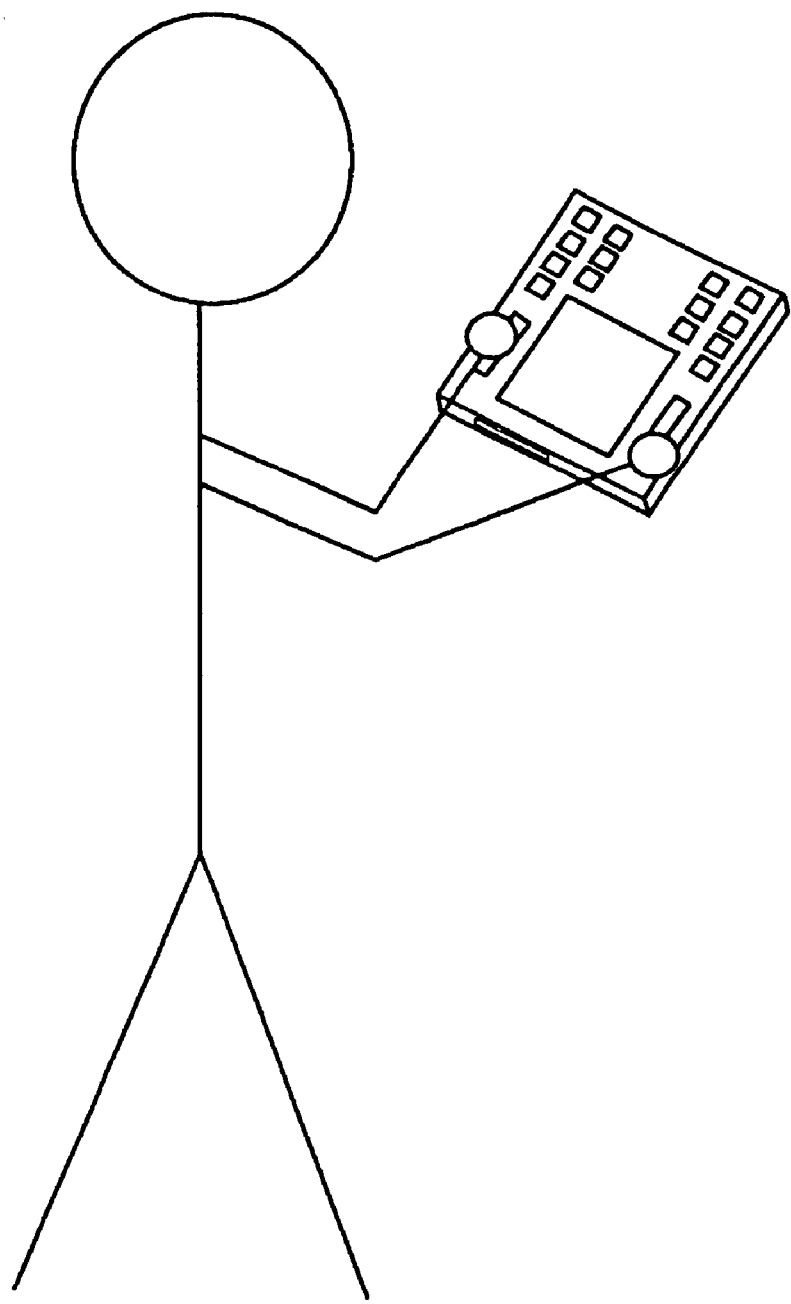
FIG. 2 is an illustration of a person using the device of FIG. 1.

FIG. 2 is an illustration of a person using the device of FIG. 1 and depicts the manner in which the hand held device might be gripped.

Referring again to FIG. 1A, a tilt sensor 150 is maintained within the housing of the hand held computing device 100. A number of devices are suitable for detecting the orientation of the device with respect to horizontal. Digital levels, for example, are well known in the art and provide a digital output indicative of the amount of tilt experienced by the device with respect to horizontal. Tilt sensor 150 shown in FIG. 1A is optionally comprised of two orthogonal tilt detectors, each detecting tilt in a respective dimension.

An alternative form of tilt sensor is a Polhemus device which is a low latency 3D motion tracking and digitizing device which tracks the orientation of the device in which it is mounted in 6 degrees of freedom, namely, X, Y, Z roll, pitch and yaw. Polhemus devices are manufactured by Polhemus Incorporated of Colchester, Vt.

FIG. 1B illustrates a block diagram of the internal hardware of the computer of FIG. 1A. A bus 150 serves as the main information highway interconnecting the other components of the computer. CPU 155 is the central processing unit of the system, performing calculations and logic operations required to execute a program. Read only memory (160) and random access memory (165) constitute the main memory of the computer. Disk controller 170 interfaces one or more disk drives to the system bus 150. These disk drives may be floppy disk drives, such as 173, internal or external hard drives, such as 172, or CD ROM or DVD (Digital Video Disks) drives such as 171. A display interface 175 interfaces display 120 and permits information from the bus to be displayed on the display. Communications with external devices can occur over communications port 185. A keyboard or keypad is shown sharing interface 145 with tilt sensor(s) 190 and scroll activate switch(es) 140.

FIG. 1C illustrates an exemplary memory medium which can be used with drives such as 173 in FIG. 1B or 110A in FIG. 1A. Typically, memory media such as a floppy disk, or a CD ROM, or a Digital Video Disk will contain, inter alia, one or more computer programming or routing to enable the computer to perform its information displaying functions.

Figure 3:
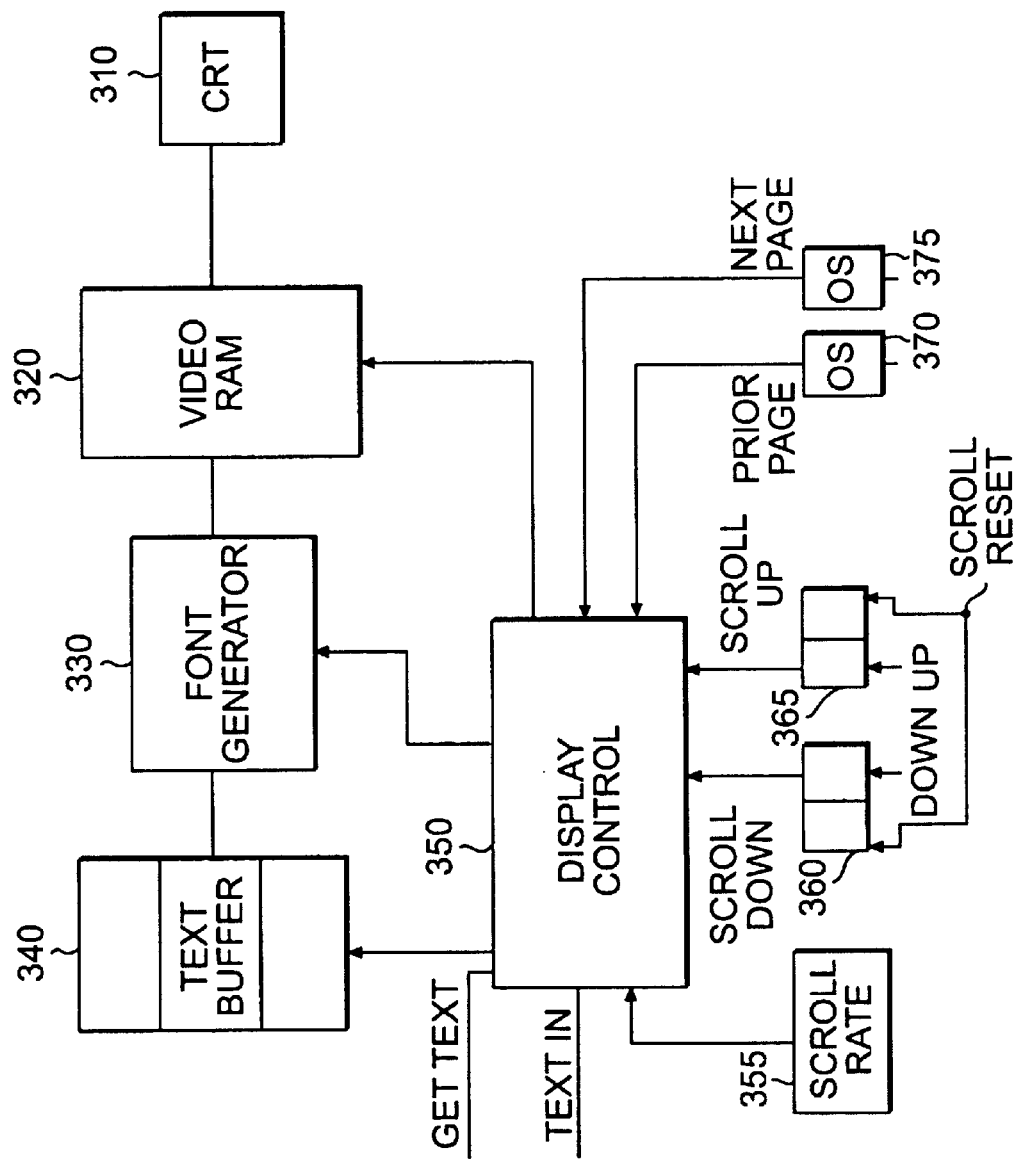
FIG. 3 is a block diagram of text display apparatus and functions in accordance with the invention.

FIG. 3 is a block diagram of text display apparatus and functions in accordance with the invention. The management and control of the display of text in the viewing window of a display device 310 is well known in the art. A CRT 310, video RAM 320, font generator 330, text buffer 340 and text display control 350 are exemplary of prior art display systems. The image shown on display CRT 3 is generated by mapping values stored in a video RAM 320 to respective pixels on the CRT. When displaying text, the representation of text, typically in an ASCII form, is converted into a bit map representation of the text character utilizing a font generator 330. The bit map of the character being generated by the font generator 330 is placed at the appropriate location in the video RAM in association with other characters to form the pixel patterns for the display of the characters on the CRT. The font generator is supplied with characters from, typically, a text buffer 340 which stores blocks of data which can be retrieved as needed or as a need is interpreted. The text buffer provides individual characters or lines of characters when new lines of text are to be placed in the viewing window at either the top or bottom of the screen as scrolling occurs. The scrolling function for text involving, in the one dimensional example, moving some existing characters from inside the viewing window to outside and writing new characters to take the place of those which have scrolled off the screen at the other end of the screen. Typically, text buffer 340 is loaded with text retrieved in bulk from memory under control of text display control 350.

Figure 4:
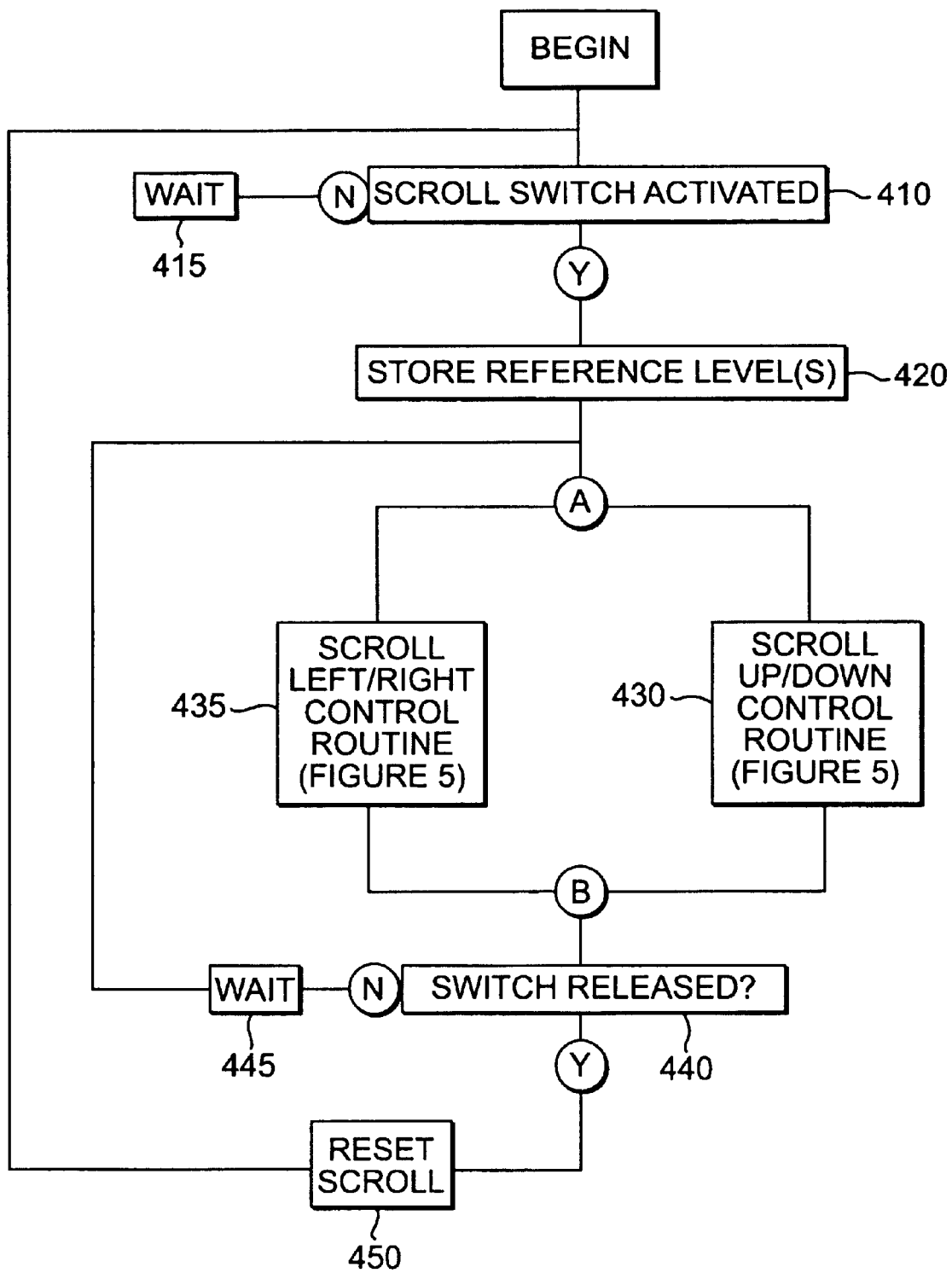
FIG. 4 is a flow chart of scrolling software in accordance with the invention.
Figure 5:
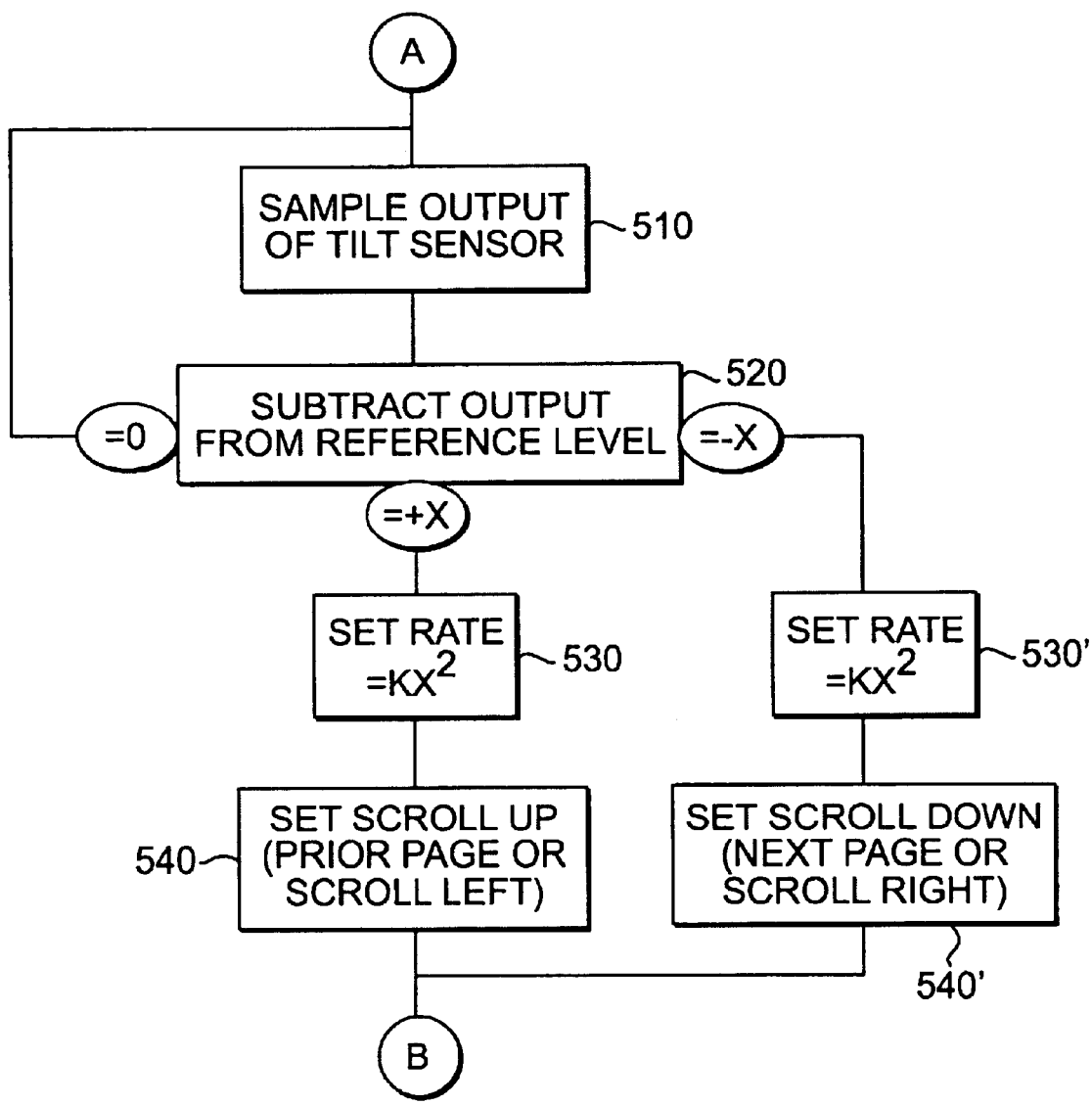
FIG. 5 is a flow chart of a scroll up/down (left/right; prior-page/next-page) software routine depicted in FIG. 4.

In FIG. 3, items 355, 360, 365, 370, and 375 represent an interface to controlling software disclosed in FIGS. 4 and 5. In block 355, represents an indication of scroll rate. Scroll rate is essentially how fast the image currently being displayed on the CRT is moved up or down the screen. Scroll rate can be measured in lines of video RAM per second, in lines of text per second, or, preferably, in points per second. "Points" are a measure of size of a particular font. Large fonts (e.g. 28 point type) have larger character sizes than smaller fonts (e.g. 8 point type). By controlling the rate of scrolling of text to a value in points per second, the rate of scrolling will be uniform regardless of the size of font on the screen. For non-textual material, scrolling is preferably measured in lines or columns of video RAM per second.

Items 360 and 365 are symbolically depicted as flip flops, each of which control a respective direction of scrolling. When scrolling is to cease, the flip flops are reset. The flip flop functionality is preferably implemented as bits of a register. Resetting can be accomplished by clearing the bits and setting by setting the bits. Items 370 and 375 control either pagination or left right scrolling. When controlling pagination, a request for the prior page or the next page will normally result in a get text request to memory which text will then be loaded into the text buffer, and the appropriate portion of the text displayed on video RAM 320.

Alternatively, items 320 and 375 can control left and right scrolling. When displaying text, it is preferred to utilize these controls for pagination. When displaying other kinds of documents, these will be utilized to move the display window in a direction orthogonal to the up and down scrolling of items 360 and 365.

FIG. 4 is a flow chart of scrolling software in accordance with the invention. In FIG. 4, a check is made to determine if a scroll switch (140 of FIG. 1A) is activated (410). If it is not, monitoring of the scroll switch continues periodically via the loop passing through item 415. Item 415 defines a wait interval before checking the switch again. By varying the amount of wait, the frequency with which the state of switches are sampled can be controlled. If a scroll switch is activated, the value of the reference orientation or orientations at the instant of the activation of the switch is detected are stored to form a reference level (420).

If, in a particular computing device, tilt is measured in only one dimension, then one of blocks 430 and 435 may be omitted. Blocks 430 and 435 are each implemented as disclosed more specifically in FIG. 5.

When scrolling has been completed, the user will release the switch(s) 140 of FIG. 1A. When the switch is released, scrolling is reset (FIG. 3) and the monitoring of scroll switch resumes (410). If the switch has not been released, the scrolling routines described with respect to FIG. 5 continue.

FIG. 5 is a flow chart of a scroll up/down (left/right; prior-page/next-page) software routine shown in FIG. 4. The output of the tilt sensor for the particular dimension being controlled is sampled at step 510. The output of the tilt sensor is subtracted from the reference level(s) stored at step 420 of FIG. 4. If there is no difference, the process loops back to the start of the routine. If the difference is in one direction, say a positive direction, the magnitude of the angular difference between the reference level and the output of the tilt sensor is utilized to set a value for scrolling rate, preferably proportional to $X^2$ (530), where ever X is the magnitude of the angular difference. The direction of scroll is then set (540). The semantics associated with setting scroll could, for example, be either "scroll up", "prior-page", or "scroll left" depending on how the system is being implemented.

If the difference between the output of the tilt sensor and the reference level is negative, then branch 530', 540' is followed. 530' and 540' correspond respectively to blocks 530 and 540 and function the same except that they are triggered by a negative result of the subtraction operation of block 520. Note that the control of either branch is the same and the actual direction of scrolling for each of those branches is somewhat arbitrary. For example, the meaning associated with 540' could easily be switched with the meanings for block 540 without changing the invention. Similarly, the meaning of a positive difference and a negative difference is also arbitrary.

The value K in blocks 530 and 530' is just a proportionality constant. For consistency of mathematics, K is assumed to have a positive value.

Figure 6:
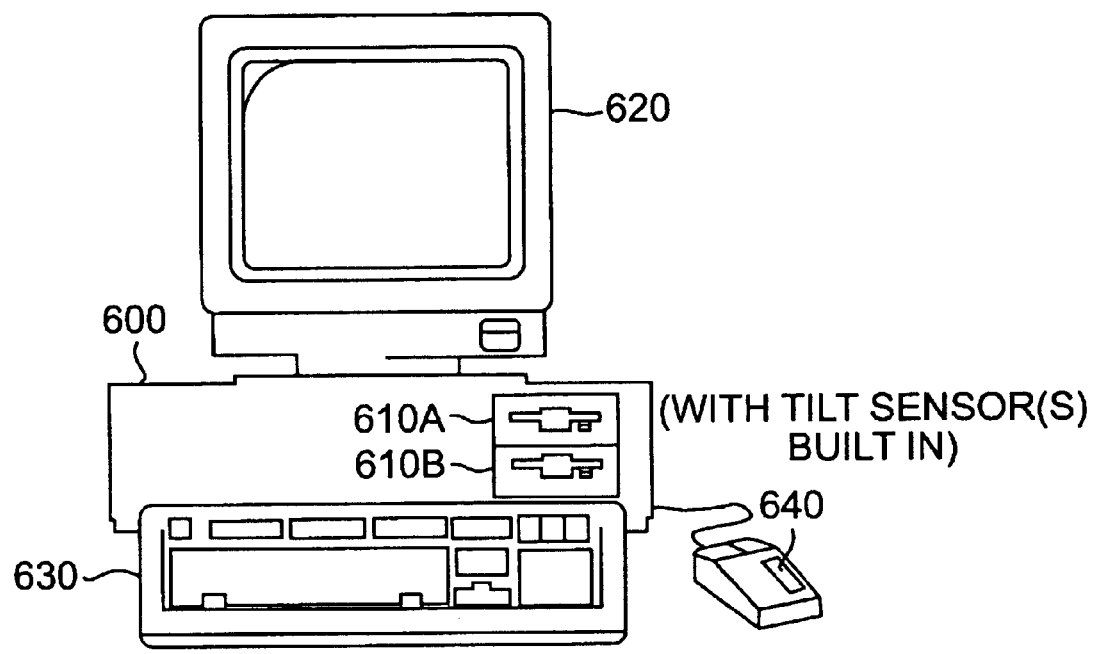
FIG. 6 illustrates a desk top computer with a tilt sensor and scroll control built into a hand held control device.

FIG. 6 illustrates a desk top computer with a tilt sensor (not visible) and scroll control 640 built into a hand held control device.

FIG. 6 illustrates a computer of a type suitable for carrying out the invention. Viewed externally in FIG. 6, a computer system has a central processing unit 600 having disk drives 610A and 610B. Disk drive indications 610A and 610B are merely symbolic of a number of disk drives which might be accommodated by the computer system. Typically, these would include a floppy disk drive such as 610A, a hard disk drive (not shown externally) and a CD ROM drive indicated by slot 610B. The number and type of drives varies, typically, with different computer configurations. The computer has the display 620 upon which information is displayed. A keyboard 630 and a mouse are typically also available.

In this embodiment, a hand held unit has tilt sensor(s) built in and has a scroll activate switch 640 used as before. The hand held unit's functions could be incorporated within a standard mouse. Preferably, the computer illustrated in FIG. 6A is a SPARC workstation from Sun Microsystems, Inc.

Figure 7:
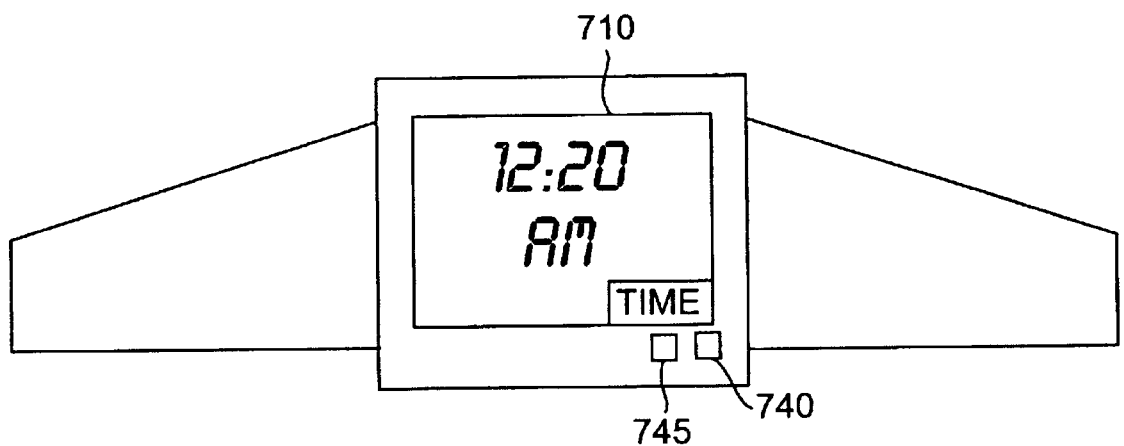

FIG. 7 is an illustration of a time piece with scroll control of the invention built in. The time piece has a display screen 710, a scroll switch 740, and one or more additional functions 745, such as an enter function. One of the problems associated with multi-function time pieces is that the user interface is so complex that it is difficult to remember how to perform the functions.

FIG. 8 shows an exemplary functional hierarchy used with the time piece. The time piece has a number of high level functions such as display time, set time, set date, stop watch and the like. There may be a number of subfunctions within each of the high level functions.

The invention can be utilized in the context of a menu or functional hierarchy to facilitate navigation of the functionality by activating the scroll function key 740 of FIG. 7 and then scrolling until a desired function is displayed. Subfunctions can be activated within a function by scrolling in an orthogonal direction and even value selections can be selected in that manner. Thus, a very complicated user interface can be navigated by simple and intuitive scrolling.

Figure 9:
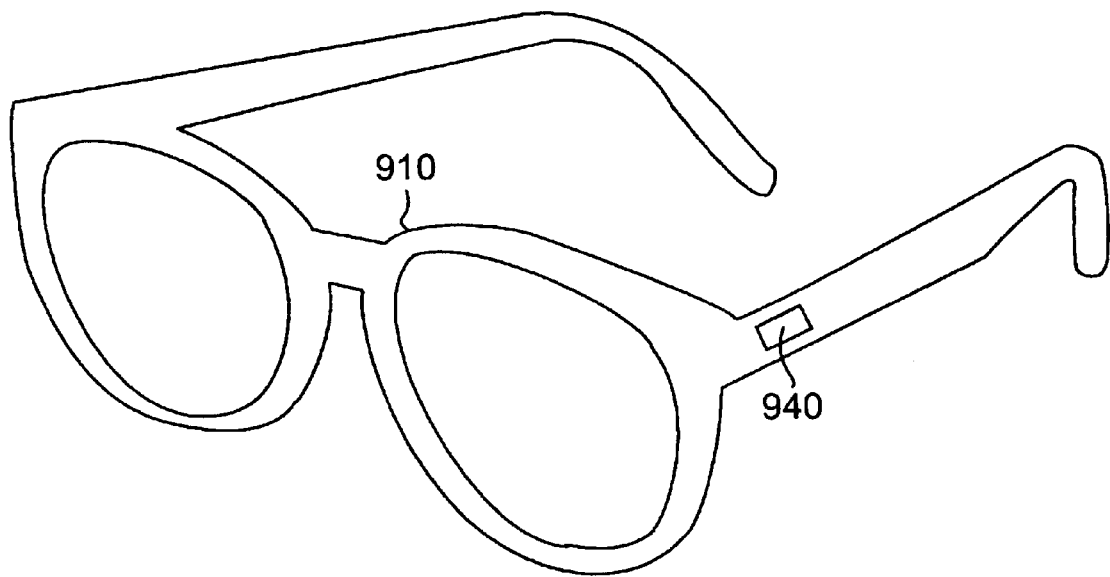
FIG. 9 is an illustration of an item of user wearable apparel with built-in and scroll control device.

FIG. 9 is an illustration of a user wearable and scroll control device in accordance with the invention. A set of eyeglasses 910 is illustrated. A scroll activation switch 940 functions in the same way that switch 140 of FIG. 1A functions. The scrolling sensors built into the eyeglasses would not be connected to a computer using a cable for obvious reasons. Rather, the scroll sensor would be linked to the computer using either infrared, optical, radio, or similar electromagnetic link. Thus, once activated by depressing switch 940, scrolling of the information on the display window of a computer device to which the eyeglasses are linked would be a function of tilt of the head on which the glasses were positioned.

Figure 10:
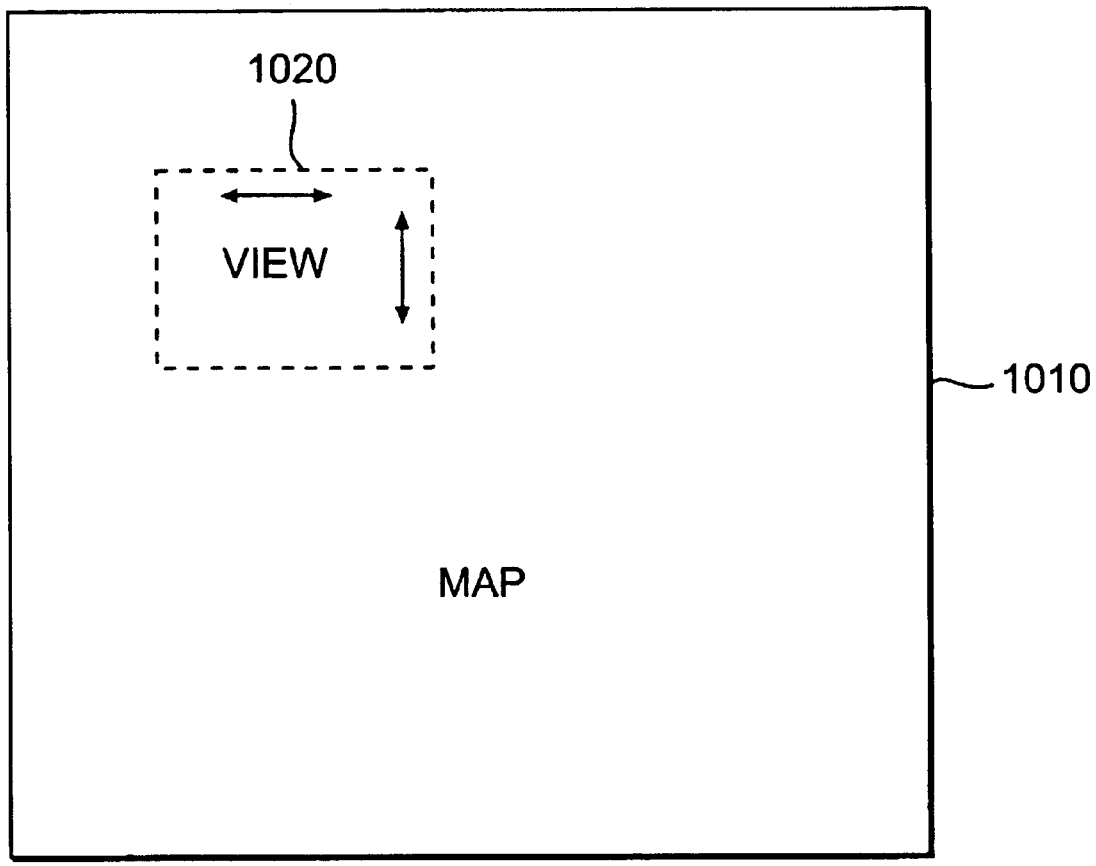
FIG. 10 illustrates a viewing window which can be scrolled over a large two dimensional document such as a map.

FIG. 10 illustrates a viewing window which can be scrolled over a large two dimensional document such as a map 1010. An entire document may require many more pixels than can be displayed upon a single CRT. The portion of the document then to be viewed on the CRT is then a function of the number of pixels in the viewing port or viewing window. The movement in two dimensions is a straightforward analog to movement using single dimension text. Buffer memory is extended to two dimensions and scrolling occurs either in one direction or in an orthogonal direction. Thus, the view port 1020 can be moved over the surface of the larger document 1010 as desired. As is known in the art, a variety of scaling functions can occur so that the amount of material compressed into a viewing window can be varied to permit changes in perspective.

Figure 11:
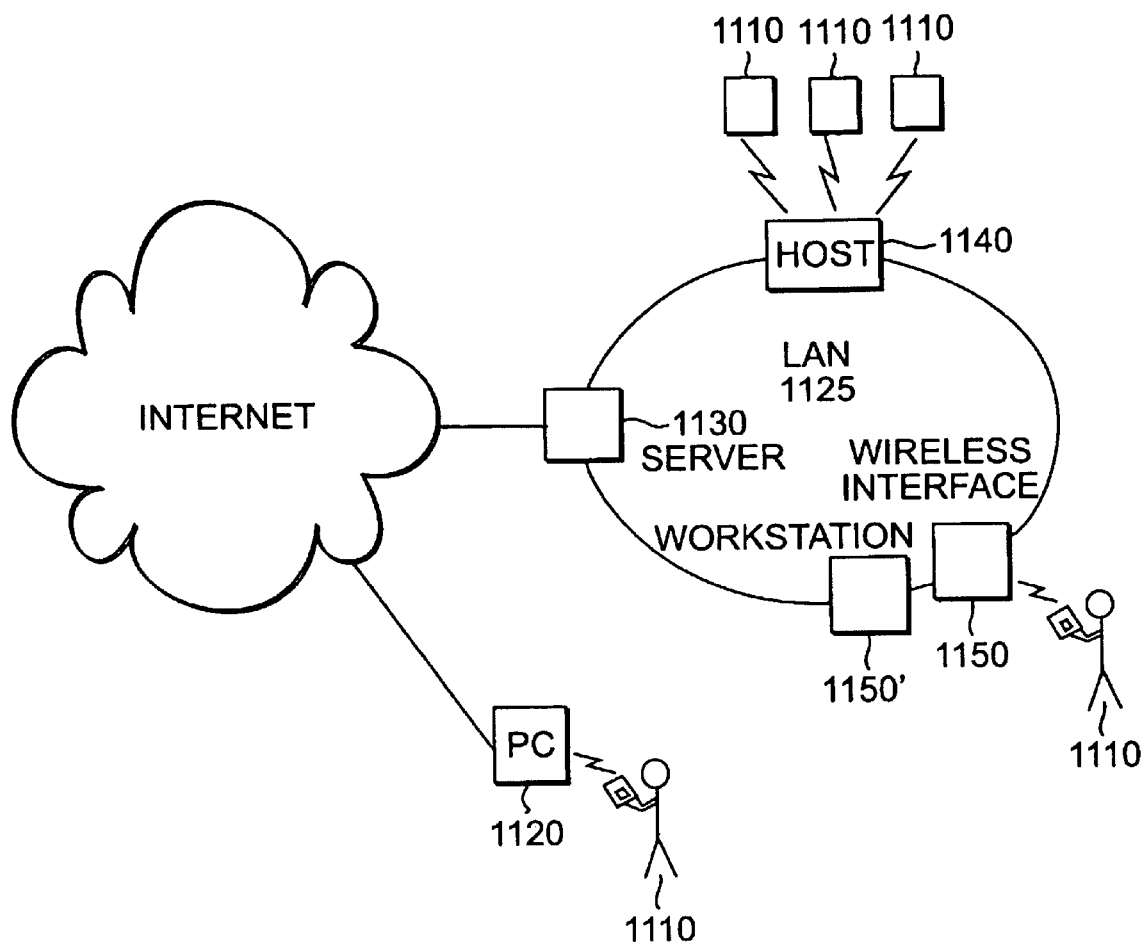
FIG. 11 illustrates the use of hand held computing devices in a network environment.

FIG. 11 illustrates the use of hand held computing devices as shown in FIG. 1A in systems and network environments. The hand held computing device of FIG. 1A, illustrated as items 1110 in FIG. 11, can be linked to an individual PC 1120. It can also be linked to wide area networks such as the Internet, either directly or a wireless cellular telephone link, or by way of a dial up connection over a related personal computing device 1120. In a local area network environment 1125, a number of work stations 1150, one or more hosts, 1140, and/or one or more servers 1130 can be connected to the local area network. A user using hand held computing device 1110 can be linked either via a wireless interface 1150 or via a wireless link to workstation 1150'. Gateway connections to wide area networks can occur over server 1130. One or more host computers, 1140, may also reside on the local area network. Hand held computing devices 1110 can access the host over wireless links, thus serving as terminals to the host.

There is thus disclosed, apparatus, methods, systems and computer program products which utilize the tilt scrolling techniques of the invention to overcome the problems of the prior art and to facilitate an improved and easy to use interface through computing devices.

In this disclosure, there is shown and described only the preferred embodiment of the invention, but, as aforementioned, it is to be understood that the invention is capable of use in various other combinations and environments and is capable of changes or modifications within the scope of the inventive concept as expressed herein.

What is claimed is:

1. A method for displaying information on a display of a computing device, comprising the step of:
   a. providing an element for performing the step of scrolling said information as a function of tilt of a control element with respect to a reference in which the step of scrolling includes scrolling at a rate which is a function of the amount of tilt in which said rate is a function of an angle squared, said angle being the angle between said reference and a current value of tilt.

2. A method for displaying information on a display of a computing device, comprising:
   providing an element for scrolling the information as a function of a tilt of a separate control element with respect to a reference in which the control element is mounted on an item of wearing apparel, wherein a tilt of the control element in one direction controls scrolling of text and a tilt of the control element in an orthogonal direction controls a page change.

3. An apparatus for displaying information on a display, comprising:
   a tilt detector;
   a scroll mode selector;
   a reference store configured to save a value of tilt detected by the tilt detector when the scroll mode selector is activated; and
   a control device connected to the tilt detector and the reference store and configured to scroll the information on the display at a rate which is a function of the difference between the output of the tilt detector and the value of tilt stored in the reference store, wherein the control device is a controller for a time piece worn on a person and the information is menu information for selecting and activating timepiece functions, and wherein at least said tilt detector and scroll mode selector are mounted on an item of user wearable apparel and linked to said display over an electromagnetic communications link.

4. A method for displaying information on a display of a computing device, comprising the step of:
   a. providing an element for performing the steps of scrolling the information as a function of a tilt of a separate control element with respect to a reference in which the control element is a watch.

* * * * *